US 8,473,079 B2

(12) United States Patent
Havlena

(10) Patent No.: US 8,473,079 B2
(45) Date of Patent: Jun. 25, 2013

(54) FAST ALGORITHM FOR MODEL PREDICTIVE CONTROL

(75) Inventor: Vladimir Havlena, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 751 days.

(21) Appl. No.: 12/626,450

(22) Filed: Nov. 25, 2009

(65) Prior Publication Data

US 2011/0125293 A1 May 26, 2011

(51) Int. Cl.
 *G05B 13/02* (2006.01)
(52) U.S. Cl.
 USPC ............................ 700/28; 60/772; 700/83
(58) Field of Classification Search
 USPC ......................................... 700/28, 83; 60/772
 See application file for complete search history.

(56) References Cited

U.S. PATENT DOCUMENTS

| | | | | |
|---|---|---|---|---|
| 8,185,217 | B2 * | 5/2012 | Thiele | 700/29 |
| 2005/0107895 | A1 * | 5/2005 | Pistikopoulos et al. | 700/52 |
| 2005/0193739 | A1 * | 9/2005 | Brunell et al. | 60/772 |
| 2006/0282177 | A1 * | 12/2006 | Fuller et al. | 700/28 |
| 2006/0282178 | A1 * | 12/2006 | Das et al. | 700/28 |
| 2008/0071395 | A1 | 3/2008 | Pachner | |
| 2009/0143872 | A1 * | 6/2009 | Thiele et al. | 700/30 |
| 2009/0198350 | A1 * | 8/2009 | Thiele | 700/30 |

OTHER PUBLICATIONS

Havlena, V., et al., "Application of model predictive control to advanced combustion control", *Control Engineering Practice*, 13, (2005), 671-680.
Wang, Yang, et al., "Fast Model Predictive Control Using Online Optimization", *Proceedings of the 17th World Congress The International Federation of Automatic Control* Seoul, Korea, Jul. 6-11, 2008, (2008), 6974-6979.

\* cited by examiner

*Primary Examiner* — Mohammad Ali
*Assistant Examiner* — Anthony Whittington
(74) *Attorney, Agent, or Firm* — Schwegman, Lundberg & Woessner, P.A.

(57) ABSTRACT

An improved process and corresponding controller provide a model predictive control approach that can be implemented with less computational resources and/or with greater speed than conventional MPC, while at the same time retaining all or a substantial portion of the robustness and advantages of conventional MPC. According to one aspect of the invention, the process provides an improved initial estimate of the MPC model trajectory to reduce the number of iterations to find the optimal one. The improved trajectory is obtained by applying a correction to the computed MPC manipulated value trajectory, and using the corrected manipulated value trajectory as the starting point for the next iteration of MPC manipulated value trajectory computation. As set forth in more detail below, the correction is determined from the LQR feedback control strategy. Since the sequence of control laws for the LQR feedback control strategy can be computed off-line and stored, the real time part of the LQR control strategy needed to determine the correction can be retrieved with relatively little computational resources.

9 Claims, 2 Drawing Sheets

FAST ALGORITHM FOR MODEL PREDICTIVE CONTROL

TECHNICAL FIELD

The present technology relates generally to automated process control, and more particularly to model predictive control.

BACKGROUND

A linear-quadratic regulator (LQR) is a feedback controller designed to operate a dynamic system at minimum cost. An LQR controller can be implemented using a state space representation of the linear (L) system as a set of input, output and state variables related by linear differential equations. The cost is described by a quadratic (Q) function, and is defined as a weighted sum of the deviations of key measurements from their desired values and the control effort. In effect this algorithm therefore finds those controller settings that minimize the undesired deviations, like deviations from desired altitude or process temperature. To abstract from the number of inputs, outputs and states, the variables may be expressed as vectors and the differential and algebraic equations are written in matrix form. The state space representation (also known as the "time-domain approach") provides a convenient and compact way to model and analyze systems with multiple inputs and outputs. While the LQR feedback control strategy is relatively fast and efficient, it is not capable of predicting the future expected response of the system, and therefore is limited to controlling the system in a reactive mode. Model predictive control (MPC) strategy, on the other hand, can predict the future likely response of a system to a control move, and incorporate the constraints on input, output, and state variables into the manipulated value trajectory design. Therefore MPC is a more powerful control, often favored over LQR control.

MPC is based on iterative, finite horizon optimization of a system model. At time t the current system state is sampled and a cost minimizing manipulated value trajectory is computed, for example using a numerical minimization algorithm, for a time horizon in the future: [t, t+T]. Specifically, an online or on-the-fly calculation is used to explore state trajectories that emanate from the current state and find a cost-minimizing manipulated value trajectory until time t+T. Such a strategy may be determined through a solution of quadratic program (QP). A first step of the manipulated value trajectory is implemented, then the system state is sampled again and the calculations are repeated starting from the now current state, yielding a new control and new predicted state path. The prediction horizon keeps being shifted forward and for this reason MPC is also called receding horizon control.

According to one example embodiment, the MPC is a multivariable control algorithm that uses an internal dynamic model of the process, a history of past control moves, and an optimization cost function J over the receding prediction horizon to calculate the optimum control moves. In one example implementation, the process to be controlled can be described by a time-invariant nth-order multiple-input multiple-output (MIMO) ARX (Autoregressive Model with External Input) model:

$$y(k) = -\sum_{i=1}^{n} A(i)y(k-i) + \sum_{i=0}^{n} B(i)u(k-i) + \sum_{i=1}^{n} C(i)v(k-i) + e(k)$$

where u(k) is a vector of $n_u$ inputs or manipulated variables (MVs), v(k) is a vector of $n_v$ disturbance variables (DVs), y(k) is a vector of $n_y$ outputs or controlled variables (CVs), e(k) is a white noise sequence of measurement noise (an $n_y$ vector) with $n_y \times n_y$ covariance matrix $\Sigma$, and A(i), B(i) and C(i) are coefficient matrices (of appropriate dimensions $n_y \times n_y$, $n_y \times n_u$ and $n_y \times n_v$). Note that the latest data that are available for the prediction of the output y(k) are the disturbance v(k−1) and the values of manipulated variable u(k). With Kalman filter enabled, also the OE (Output Error) model can be used as an alternative.

Recently the trend is to move advanced process control (APC) solutions such as MPC from the supervisory level, for example implemented in a Windows environment, to the distributed control system (DCS) controller level. A distributed control system (DCS) refers to a control system usually of a manufacturing system, process or any kind of dynamic system, in which the controller elements are not central in location but are distributed throughout the system with each component sub-system controlled by one or more controllers. The entire system of controllers is typically connected by networks for communication and monitoring.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized. Moreover, while the various views are described specifically with respect to several illustrative control systems, it should be understood that the controllers and methods described herein could be applied to the control of other types of systems, if desired.

Figure 1:
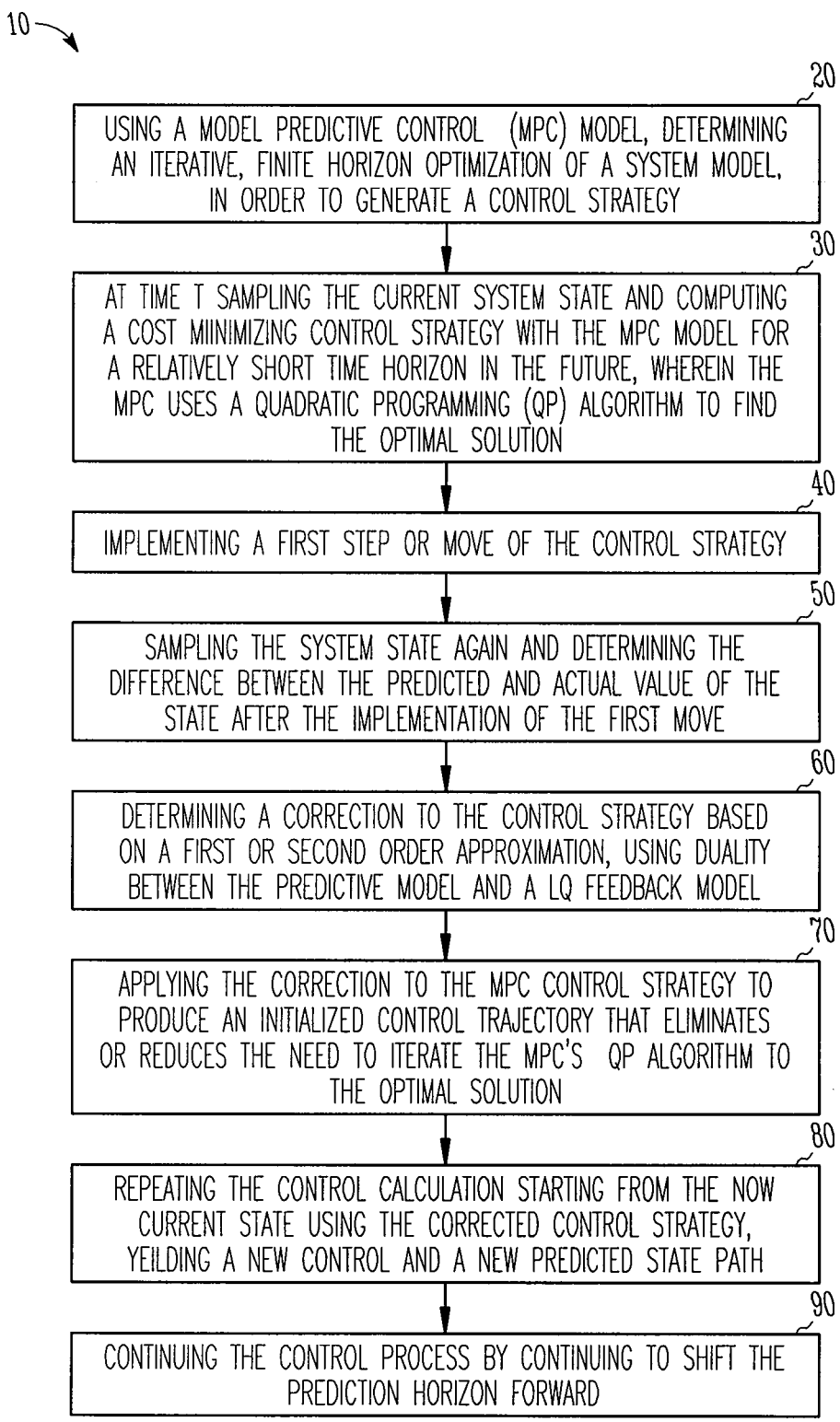
FIG. 1 illustrates a process 10 incorporating an MPC control technology according to the present invention.
Figure 2:
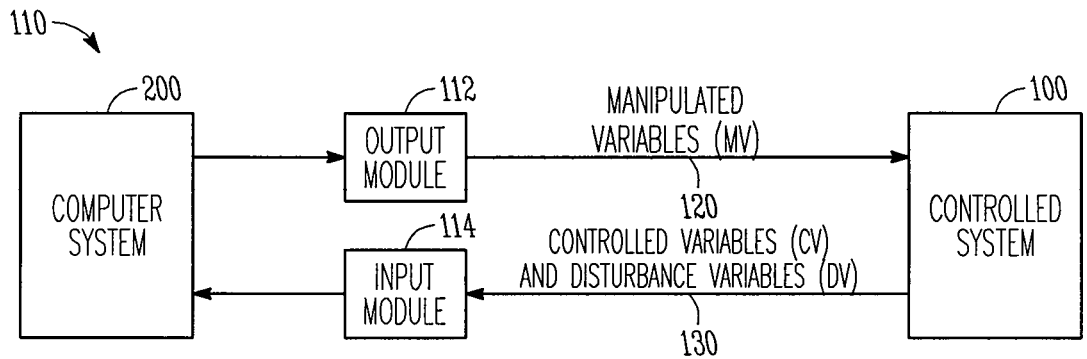
FIG. 2 illustrates a system 200 incorporating an MPC control technology according to the present invention.

Referring now to FIGS. 1 and 2, there is illustrated in flow chart and system form a first embodiment of an improved process 10 for model predictive control according to the invention. As will be described in more detail below, the improved process 10 and corresponding controller 200 provide a model predictive control approach that can be implemented with less computational resources and/or with greater speed than conventional MPC, while at the same time retaining all or a substantial portion of the robustness and advantages of conventional MPC. According to one aspect of the invention, the process provides an improved initial estimate of the MPC manipulated variable trajectory to reduce the number of iterations to find the optimal one. The improved trajectory is obtained by applying a correction to the MV trajectory computed in the previous iteration, and using the corrected manipulated value trajectory as the starting point for the next iteration of MPC manipulated value trajectory computation. As set forth in more detail below, the correction is determined from the LQR feedback control strategy. Since the sequence of control laws for the LQR control strategy can be computed off-line and stored, the real-time part of the LQR control strategy needed to determine the correction can be implemented with relatively little computational resources.

Accordingly, the process 10 and system 200 provide for:
a. Using an MPC model, determining an iterative, finite horizon optimization of a system model, in order to generate a manipulated value trajectory.
b. At time t sampling the current system state and computing a cost minimizing manipulated value trajectory with the MPC model, for example using a numerical minimization algorithm, for a relatively short time horizon in the future: [t, t+T].
c. Implementing a first step or move of the manipulated value trajectory.
d. Sampling the system state again and determining the difference between the predicted and actual value of the state after the implementation of the first move.
e. Determining a correction to the manipulated value trajectory based on a first or second order approximation, using the duality between the predictive and feedback in a linear quadratic (LQ) manipulated value trajectory. According to one example embodiment, the correction is determined using a manipulated value trajectory determined with a LQR model using the difference between the predicted and actual value of the state. According to another example embodiment, for a second order approximation a neighboring extremal method approach can be applied.
f. Applying the correction to the MPC manipulated value trajectory to produce an initialized control trajectory that eliminates or reduces the need to iterate the MPC's quadratic programming (QP) algorithm to the optimal solution. In one example embodiment, only a single iteration is done at given sample, and the controller can be implemented in "Iteration Spread in Time" way.
g. Repeating the control calculation starting from the now current state using the corrected manipulated value trajectory, yielding a new control and new predicted state path.
h. Continuing the control process by continuing to shift the prediction horizon forward.

In one example implementation, if the resulting state after the application of the first control move is $x(2) \neq x\_pred(2)$, the next run of the QP can "reuse" the manipulated value sequence u(2), u(3) . . . with an LQ-based correction $u(2|2) = u(2|1) + K(2) \cdot [x(2) - x\_pred(2)]$, using notation: u(2|1) . . . the value of u(2) calculated based on x(1) at sample time T=1, u(2|2) . . . the value of u(2) calculated based on x(2) at sample time T=2.

Thus, as described above, the LQ MPC control strategy calculates the manipulated value sequence u(1) . . . u(T) to minimize the quadratic cost function on the horizon T, wherein:
a. The whole manipulated value sequence is calculated based on the knowledge of current state x(0).
b. Current and future constraints are included in the optimization procedure based on the manipulated value sequence and predicted state/output sequence (in open loop).
c. No future information (effect of disturbances, model uncertainty etc. at times 1, 2, . . . T) is taken into account.

d. Only the first calculated value u(1) is implemented, and after that, the whole calculation is repeated at the next sampling period.
e. The control implementation is very demanding on computation power (QP—quadratic programming).

Thus, the present invention provides a LQ MPC control strategy that may be implemented with less computational power than a conventional MPC control strategy implementation. According to a further, alternate embodiment, the above described process (and system) may be extended using blocking to further reduce the computational complexity, and more particularly the dimensionality of the QP problem. More specifically, in this implementation, input blocking is used to reduce the computational complexity by reducing the number of independent moves of manipulated variables. For example, blocking like [u(1)=u(2)=u(3), u(4)=u(5)=u(6), u(7)=u(8)=u(9)=u(10)] results in a control sequence with only 3 independent variables instead of 10. Further, output blocking may be used in addition to or as an alternative to input blocking. More specifically, output blocking in this embodiment is used to reduce the computational complexity by reducing the number of output samples used in the criterion. For example output blocking may be employed by using only the values of output y(t) for t=2, 4, 6, 8, 10 for the criterion.

Thus, according to one example embodiment, process 10 is modified to include blocking. In one such implementation, the LQ control law is calculated for a system with input changes for example at time 1, 4 and 7, and the outputs are considered at selected time instants 2, 4, 6, 8 and 10, which can be achieved by mathematical manipulations with the system state space model. The correction of the next control movement based on the discrepancy between the predicted state x_pred(2) and measured state x(2) can thus be based on LQ control law designed for the modified state space model.

According to another example embodiment, the inventive subject matter applies the duality between the MPC and LQ control strategies to the cases with blocking applied to MV as well as CV values. By the development of equivalent dynamic system with blocking, MPC equivalent LQ control strategy can be calculated. The benefit of LQ approach is that most of the computational effort can be carried off line and the resulting controller in the form of a simple state feedback law can be used in real time.

Referring now to FIG. 2, there is illustrated a simplified block diagram of a controlled system 100 under the control of a controller 110. Controller 110 includes a computer system 100, an output module 112, and an input module 114. In operation, controller 110 generates sequence of manipulated variables 120 from module 112 and receives sequence of controlled variables and disturbance variables 130 from input module 114. Control inputs and outputs 120 and 130 may take the form of analog or digital control signals sent to and received from controlled system 100.

Figure 3:
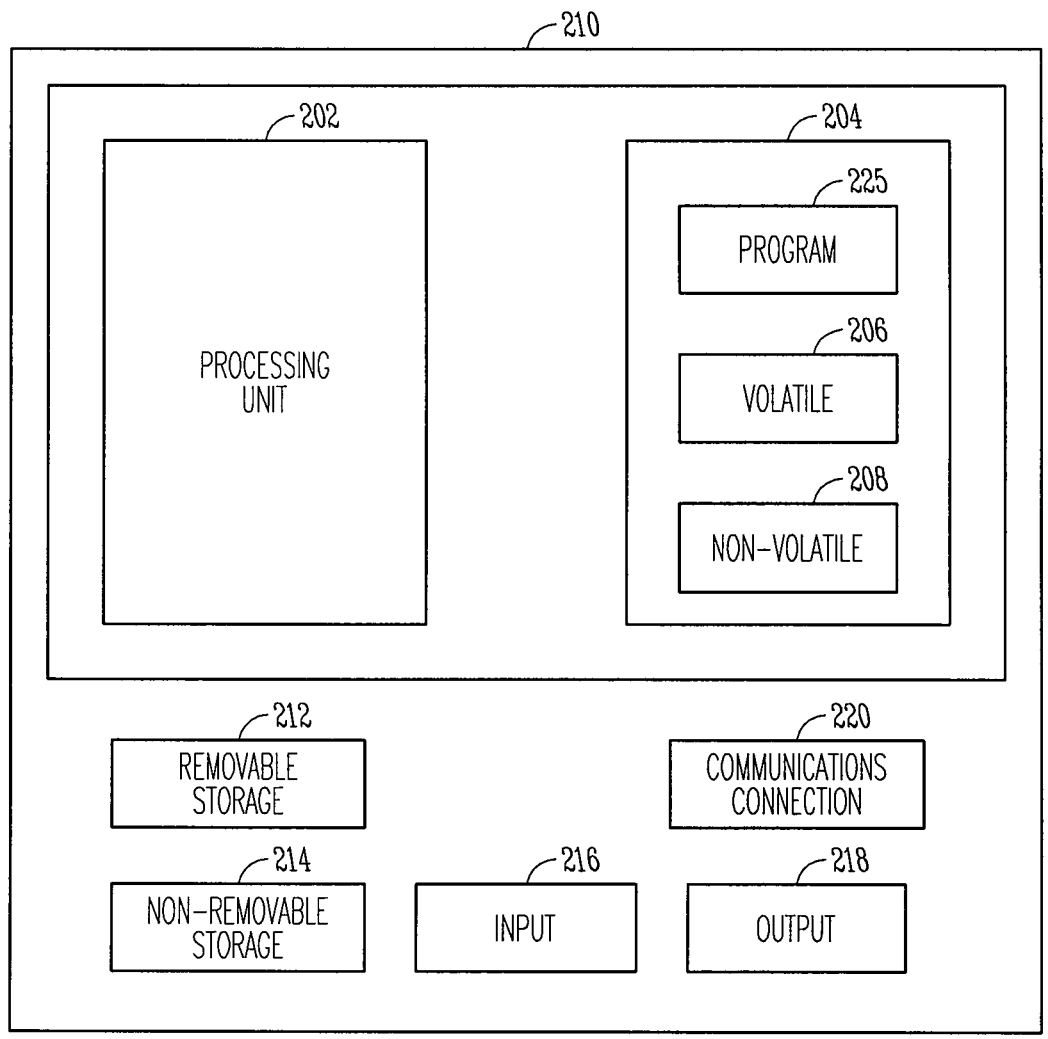
FIG. 3 illustrates an example computing system 210 for use in a controller according to the present invention.

Referring now to FIG. 3, there is illustrated a block diagram of a computer system 200 that executes programming for implementing the above-described process control or system identification algorithms. A general computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other tangible and physical medium capable of storing computer-readable instructions. Computer 210 may include or have access to a computing environment that includes input 216, output 218, and a communication connection 220. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a tangible and physical computer-readable medium are executable by the processing unit 202 of the computer 210. A hard drive, CD-ROM, and RAM are some examples of articles including a computer-readable medium.

The Abstract is provided to comply with 27 C.F.R. §1.72(b) is submitted with the understanding that it will not be used to interpret or limit the scope or meaning of the claims.

Thus, the methods and systems described above reduce the number of iterations of the QP algorithm required to calculate a useful and effective control path. Accordingly, the improved MPC control strategy can be deployed using less computational resources. The reduced computation time afforded by the improved approach is particularly useful for applications with limited resources and/or short sampling period.

What is claimed is:

1. A method of predictive model control of a controlled system, comprising:
   using a model predictive control (MPC) model, determining an iterative, finite horizon optimization of a system model of the controlled system, in order to generate a manipulated value trajectory;
   at time t sampling a current state of the controlled system and computing a cost minimizing manipulated value trajectory with the MPC model for a relatively short time horizon in the future, wherein the MPC uses a quadratic programming (QP) algorithm to find the optimal solution;
   implementing a first step or move of the manipulated value trajectory;
   sampling the controlled system state again and determining the difference between the predicted and actual value of the state after the implementation of the first move;
   determining a correction to the manipulated value trajectory based on a first or second order approximation, using duality between the MPC model and a LQ feedback model;
   applying the correction to the MPC manipulated value trajectory to produce an initialized control trajectory that eliminates or reduces the need to iterate the MPC's QP algorithm to the optimal solution;
   repeating the control calculation starting from the now current state using the corrected manipulated value trajectory, yielding a new control and new predicted state path; and
   continuing the control process by continuing to shift the prediction horizon forward.

2. A method according to claim 1 further including using input or output blocking to reduce the computational complexity of the LQ feedback control strategy.

3. A method according to claim 1 further including computing a sequence of state feedback control laws for the LQ feedback control strategy off-line, storing the LQ control laws, and retrieving the LQ control laws for the purpose of determining the correction to the MPC manipulated value trajectory.

4. A controller used to control a controlled system, comprising:
   a computer system including one or more computer programs operative on the computer system to:
   use a model predictive control (MPC) model and determine an iterative, finite horizon optimization of a system model for the controlled system, in order to generate a manipulated value trajectory;
   at time t sample a current state of the controlled system and compute a cost minimizing manipulated value trajectory with the MPC model for a relatively short time horizon in the future, wherein the MPC uses a quadratic programming (QP) algorithm to find the optimal solution;
   implement a first step or move of the manipulated value trajectory;
   sample the controlled system state again and determine the difference between the predicted and actual value of the state after the implementation of the first move;
   determine a correction to the manipulated value trajectory based on a first or second order approximation, use duality between the MPC model and a LQ feedback model;
   apply the correction to the MPC manipulated value trajectory to produce an initialized control trajectory that eliminates or reduces the need to iterate the MPC's QP algorithm to the optimal solution;
   repeat the control calculation starting from the now current state using the corrected manipulated value trajectory, yielding a new control and new predicted state path; and
   continue the control process by continuing to shift the prediction horizon forward.

5. A system according to claim 4 further wherein the one or more computer programs use input or output blocking to reduce the computational complexity of the LQ feedback model.

6. A system according to claim 4 further wherein the one or more computer programs retrieve the LQ control laws stored for the purpose of determining the correction to the MPC manipulated value trajectory.

7. A non-transitory computer readable medium comprising instructions for executing a process of predictive model control of a controlled system, the process comprising:
   using a model predictive control (MPC) model, determining an iterative, finite horizon optimization of a system model of the controlled system, in order to generate a manipulated value trajectory;
   at time t sampling a current state of the controlled system and computing a cost minimizing manipulated value trajectory with the MPC model for a relatively short time horizon in the future, wherein the MPC uses a quadratic programming (QP) algorithm to find the optimal solution;
   implementing a first step or move of the manipulated value trajectory;
   sampling the controlled system state again and determining the difference between the predicted and actual value of the state after the implementation of the first move;

determining a correction to the manipulated value trajectory based on a first or second order approximation, using duality between the MPC model and a LQ feedback model;

applying the correction to the MPC manipulated value trajectory to produce an initialized control trajectory that eliminates or reduces the need to iterate the MPC's QP algorithm to the optimal solution;

repeating the control calculation starting from the now current state using the corrected manipulated value trajectory, yielding a new control and new predicted state path; and continuing the control process by continuing to shift the prediction horizon forward.

8. The non-transitory computer readable medium of claim 7, further comprising instructions for using input or output blocking to reduce the computational complexity of the LQ feedback control strategy.

9. The non-transitory computer readable medium of claim 7, further comprising instructions for computing a sequence of state feedback control laws for the LQ feedback control strategy off-line, storing the LQ control laws, and retrieving the LQ control laws for the purpose of determining the correction to the MPC manipulated value trajectory.

* * * * *